United States Patent
Thorborg

[15] 3,703,644
[45] Nov. 21, 1972

[54] SYNCHRONIZING DEVICE
[72] Inventor: Kjeld Thorborg, Vasteras, Sweden
[73] Assignee: Allmanna Svenska Elektriska Aktiebolaget, Vasteras, Sweden
[22] Filed: March 9, 1972
[21] Appl. No.: 233,187

[30] Foreign Application Priority Data
March 24, 1971 Sweden ............. 3810/71

[52] U.S. Cl. .................................. 307/64
[51] Int. Cl. ................................. H02j 7/00
[58] Field of Search .......... 307/85, 86, 87, 64, 65, 66, 307/43, 84, 57

[56] References Cited
UNITED STATES PATENTS
3,339,082  8/1967  Rhyne, Jr. ................. 307/64
3,515,895  6/1970  Brutton ..................... 307/64
3,612,894  10/1971 Schmidt ................. 307/64 UX Primary Examiner—Herman J. Hohauser
Attorney—Jennings Bailey, Jr.

[57] ABSTRACT

A synchronizing device for achieving frequency and phase similarity between an output voltage from an inverter and the voltage from a second alternating voltage source includes an oscillator for delivering an output signal in the form of control pulses to the inverter, so that the input voltage of the inverter has a frequency corresponding to that of the control pulses. The second alternating voltage source supplies pulses to the oscillator to lock the output signal of the oscillator in frequency to the frequency of said alternating voltage source. The output signal of the oscillator is supplied to the inverter over a phase-shifting member. A phase-sensitive member is supplied with the output signal of the oscillator and the output of the inverter, and forms an analogue signal depending on the phase difference therebetween. This analogue signal is supplied to the phase-shifting member to affect the phase shifting so that the phase difference is steered towards zero.

1 Claim, 3 Drawing Figures

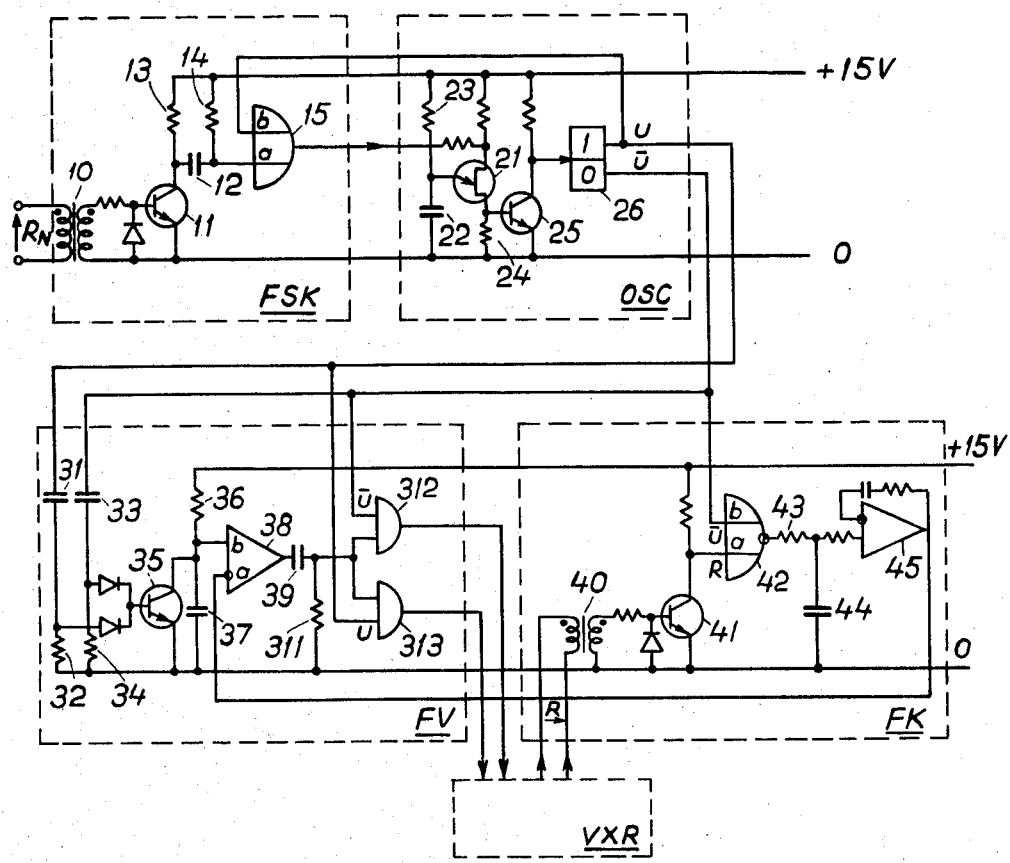

SYNCHRONIZING DEVICE

BACKGROUND OF THE INVENTION

1. Field of the Invention

The present invention relates to a synchronizing device to achieve frequency and phase similarity between the output voltage from an inverter and the voltage from a second alternating voltage source.

2. The Prior Art

The type of equipment in which the device according to the invention is to be used includes a load object connected over a contact, normally closed to an alternating voltage source from which it is fed. An inverter is connected by the contact to the load object. The inverter is fed from a direct voltage source and includes four thyristors, commutating rectifiers, a commutating capacitor, feed back diodes and an output transformer. An oscillator delivers control pulses to the thyristors and the output voltage will therefore, as far as frequency and phase position are concerned, be determined by the control pulses from the oscillator.

Particularly with certain types of load object, it is extremely important that there is as little alteration as possible in frequency and phase of the feeding voltage when changing over to feeding from the inverter.

Summary of the Invention

According to the invention, there is provided an arrangement for achieving frequency and phase similarity between an output voltage from an inverter and the voltage from a second alternating voltage source includes an oscillator for delivering an output signal in the form of control pulses to the inverter, so that the output voltage of the inverter has a frequency corresponding to that of the control pulses. The second alternating voltage source supplies pulses to the oscillator to lock the output signal of the oscillator in frequency to the frequency of said alternating voltage source. The output signal of the oscillator is supplied to the inverter over a phase-shifting member. A phase-sensitive member is supplied with the output signal of the oscillator and the output of the inverter, and forms an analogue signal depending on the phase difference therebetween. This analogue signal is supplied to the phase-shifting member to affect the phase shifting so that the phase difference is steered towards zero.

BRIEF DESCRIPTION OF THE DRAWINGS

The accompanying

FIG. 2 shows a block diagram of an embodiment of the device according to the invention and FIG. 3 shows the construction of the device in more detail.

An example of equipment when the device according to the invention gives considerable advantages is shown in the accompanying claim 1. A load object L is connected via the contact S1, normally closed, to an alternating voltage source, from which it is also fed with the voltage $R_N$. An inverter VXR is connected by way of the contact S2 to the load object. The inverter is fed from the direct voltage source D. The inverter comprises four thyristors T1 – T4, commutating reactors R1 and R2, a commutating capacitor C, feedback diodes D1 – D4 and an output transformer TR. An oscillator OSC delivers control pulses to the thyristors in known manner and the output voltage R will therefore, as far as frequency and phase position are concerned, be determined by the control pulses from the oscillator. S2 may normally be open. If $R_N$ disappears S1 opens and S2 closes, whereupon VXR takes over feeding the load object L. Therefore, particularly with certain types of load object, it is extremely important that there is as little alteration as possible in frequency and phase of the feeding voltage when changing over to feeding from the inverter.

Description of the Preferred Embodiments

Figure 1:
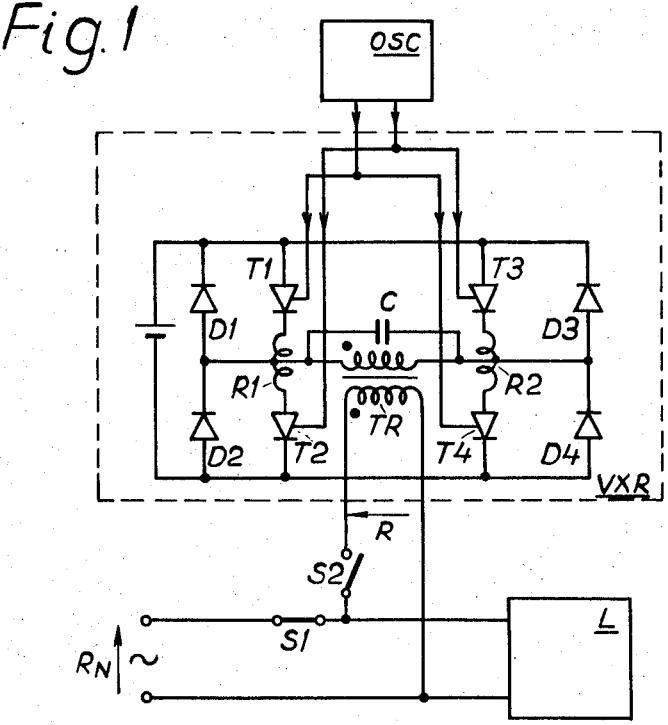
FIG. 1 shows an example of equipment in which the device according to the invention is intended to be used.
Figure 2:
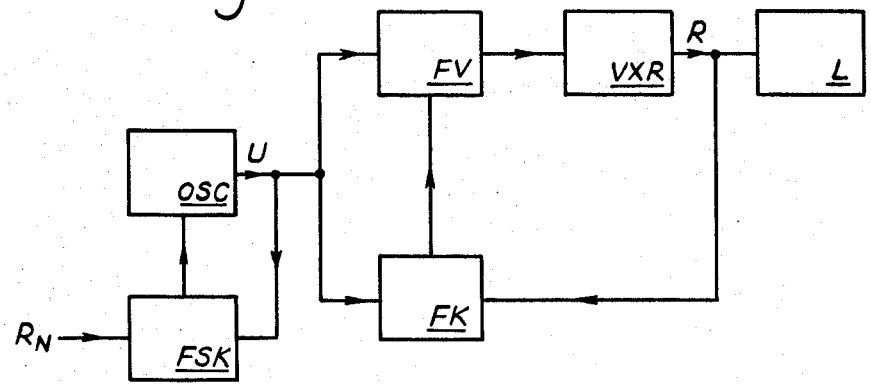

FIG. 2 shows the oscillator OSC and the inverter VXR according to FIG. 1. The voltage, $R_N$, to which the output voltage R of the inverter is to be synchronized is supplied to a frequency synchronizing circuit FSK, to which the output voltage U of the oscillator is also supplied. FSK delivers such signals to OSC that U becomes locked in frequency and phase to $R_N$. U and R are supplied to a phase-sensitive circuit FK, which forms a signal depending on the phase difference between U and R. This signal is then supplied to a phase-shifting circuit FV and affects the phase-shifting in this circuit. The output signal U from the oscillator is supplied to VXR over FV and will therefore be phase-shifted according to the phase difference between U and R. FK and FV are so arranged that if there is a phase difference between U and R, FV alters its phase-shifting in such a direction that said phase difference is guided towards zero. FK and FV therefore together with VXR form a closed control circuit which controls R to phase similarly with U and thus with $R_N$.

FIG. 3 shows the units forming the device in more detail.

The voltage $R_N$ is supplied through the transformer 10 to the transistor 11 included in FSK, this transistor being conducting during the positive half periods of $R_N$. Due to the action of the RC circuit 12, 13, 14, at the start of every positive half period of $R_N$ a short negative pulse (corresponding to a logical zero) will be delivered to the input a of the OR circuit 15, the other input b of which is supplied with the output signal U from the oscillator. Except during said negative pulses, the input a receives a positive voltage (corresponding to a logical one [1]. If, therefore, U is zero at the start of a positive half period of $R_N$ the output signal from the OR circuit will be zero simultaneously with and for as long as said short pulse, but for the rest of the time will be positive and correspond to a logical one (1).

The oscillator OSC comprises a double base diode 21, the emitter of which is connected to a frequency-determining RC circuit 22, 23. Every time the emitter voltage reaches a certain fraction of the voltage of the upper base of the diode, the capacitor is momentarily discharged through the emitter and the resistor 24, whereupon the transistor 25 becomes conducting and trips the flip-flop device 26 from its previous position to its second position. The natural frequency of the oscillator is arranged to be somewhat less than the normal frequency of $R_N$. Every time a short zero pulse is emitted from the OR circuit 15 at the beginning of a positive half period of $R_N$, the double base diode will discharge the capacitor 22 and thus trip the flip-flop 26. The feed-back from the output U of the flip-flop 26 to the input b of the OR circuit results in U and $R_N$ coming into phase with each other and not counter phase.

Thus, due to the phase synchronizing circuit FSK U and $R_N$ are brought to both frequency and phase similarity.

In the phase sensitive circuit FK, R is supplied through the transformer 40 and the transistor 41 to the input a of the NOR circuit 42, the input b of this being supplied with $\overline{U}$. The output signal from 42 will then be pulses having constant frequency and a pulse length which is proportional to the phase difference between R and U. The pulses are integrated in the circuit 43, 44 and supplied to the phase shifting circuit FV through the amplifier 45, the output signal of which is a direct voltage having a value corresponding to said phase difference.

The phase shifting circuit FV is supplied with U and $\overline{U}$ from OSC over the differentiating circuits 31, 32 and 33, 34. At the start of each half period of U, therefore, the capacitor 37 will be short-circuited for a moment across the transistor 35, and thus discharged. During the half period 37 will then be charged through the resistor 36. The capacitor voltage, which is thus a voltage which increases continuously during each half period of U, is supplied to the input b of the amplifier 38, to the inverted input a of which the voltage obtained from FK, which is proportional to the phase difference between U and R, is fed. When the capacitor voltage reaches the same value as the voltage from FK, the output voltage from 38 becomes positive and a positive pulse (corresponding to a logical one [1]) is delivered over the differentiating circuit 39, 311 to the AND circuits 312 and 313. These circuits are also supplied with the signals U and $\overline{U}$, respectively, from OSC. Together with the pulses from 38, output pulses are obtained alternately from 312 and 313. The pulses from 312 initiate firing of those rectifiers in the inverter which give a positive half period for R, i.e., the thyristors T1 and T4 in FIG. 1. The pulses from 313 initiate firing of those rectifiers which give a negative half period for R (the thyristors T2 and T3 in FIG. 1).

FK will therefore control the delay in FV in such a way that there is phase similarity between U and R. Since U has the same frequency and phase as $R_N$, therefore, R will be continuously regulated to agreement with $R_N$ as concerns both frequency and phase.

If the voltage $R_N$ disappears, the oscillator will go on oscillating and control the inverter which then takes over or continues feeding the load object.

Above the device according to the invention has been shown in use in an inverter which is intended to provide reserve power if an alternating network disappears. However, it may also be used for other purposes, for example, for synchronizing parallel-operating inverters with each other.

A filter may be arranged in known manner on the output side of the inverter in order to improve the curve shape of the output voltage. The inverter connection shown in FIG. 1 is only an example and the synchronizing device according to the invention can of course be used for other types of inverters as well.

Furthermore, a device has only been shown for a single phase inverter. A device adapted for a three phase inverter may be constructed in principle in the same way. The oscillator may then be arranged to give three output voltages U, V and W which are locked in frequency and phase to the three phase or main voltages ($R_N$, $S_N$, $T_N$) of the voltage source to which the inverter is to be synchronized. The frequency synchronizing logic must then be designed so that, for example U is locked to $R_N$ and not to $S_N$ or $T_N$, and is therefore more complicated then the circuit shown. The same goes for the other circuits included in the device, which are designed so that for example R is guided to phase similarity with U and not with V or W.

I claim:

1. Synchronizing device to achieve frequency and phase similarity between the output voltage from an inverter having substantially sine-shaped output voltage and the voltage of a second alternating voltage source, comprising an oscillator means to deliver an output signal in the form of control pulses to the inverter, whereby the output voltage of the inverter has a frequency corresponding to the frequency of said control pulses, means connected to said second alternating voltage source to supply pulses derived therefrom to the oscillator means to lock the output signal of the oscillator in frequency to the frequency of said second alternating voltage source, a phase-shifting member, means to supply the output signal of the oscillator to the inverter over said phase-shifting member, a phase-sensitive member, means to supply to said phase-sensitive member the oscillator's output signal and the inverter's output voltage, said phase-sensitive member including means to form an analogue signal dependent on the phase difference between said output signal and output voltage, said phase-shifting member including means responsive to said analog signal to affect the phase-shifting in this so that said phase difference is steered towards zero.

* * * * *